US012769799B2

(12) United States Patent
Chauhan et al.

(10) Patent No.: US 12,769,799 B2
(45) Date of Patent: Oct. 20, 2026

(54) REAL-TIME AI-DRIVEN SPEAKING SUGGESTIONS DURING ASYNCHRONOUS VIDEO CAPTURE

(71) Applicant: Emovid Corporation, Redmond, WA (US)

(72) Inventors: Digvijay Chauhan, Redmond, WA (US); Victor Cho, Burlingame, CA (US); Rupali Pathania, Redmond, WA (US)

(73) Assignee: Emovid Corporation, Redmond, WA (US)

( * ) Notice: Subject to any disclaimer, the term of this patent is extended or adjusted under 35 U.S.C. 154(b) by 228 days.

(21) Appl. No.: 18/617,384

(22) Filed: Mar. 26, 2024

(65) Prior Publication Data

US 2024/0330380 A1 Oct. 3, 2024

Related U.S. Application Data

(60) Provisional application No. 63/492,346, filed on Mar. 27, 2023.

(51) Int. Cl.

| | |
|---|---|
| ***G06F 16/9535*** | (2019.01) |
| ***G06F 3/0485*** | (2022.01) |
| ***G10L 15/26*** | (2006.01) |
| ***H04L 51/10*** | (2022.01) |
| ***H04N 7/14*** | (2006.01) |

(52) U.S. Cl.

CPC ........ *G06F 16/9535* (2019.01); *G06F 3/0485* (2013.01); *G10L 15/26* (2013.01); *H04L 51/10* (2013.01); *H04N 7/14* (2013.01)

(58) Field of Classification Search

CPC ... G06F 16/9535; G06F 3/0485; G10L 15/26; H04L 51/10; H04N 7/14

See application file for complete search history.

(56) References Cited

U.S. PATENT DOCUMENTS

| | | | | |
|---|---|---|---|---|
| 2019/0206031 | A1* | 7/2019 | Kim | G06T 5/80 |
| 2024/0427815 | A1* | 12/2024 | Zhang | G06F 16/436 |
| 2025/0063239 | A1* | 2/2025 | Gustman | H04N 21/8545 |

OTHER PUBLICATIONS

Gustman et al., U.S. Appl. No. 63/492,174 of U.S. Appl. No. 18/617,384, filed Mar. 24, 2023 (Year: 2023).*

Geeta S Hukkeri et al., Machine Learning-Based Personalized Recommendation System for E-Learners, Dec. 16, 2022, International Conference on Smart Technologies in Computing—Electrical and Electronics, pp. 1-6 (Year: 2022).*

Shuria Saaidin et al., Recommender System: Rating predictions of Steam Games Based on Genre and Topic Modelling, Jun. 1, 2020, Internation Conference on Automatic Control and Intelligent Systems, pp. 212-218 (Year: 2020).*

* cited by examiner

*Primary Examiner* — Tam T Tran

(74) *Attorney, Agent, or Firm* — Seed Intellectual Property Law Group LLP

(57) ABSTRACT

A facility for assisting recording of an audio/video message is described. The facility receives user input specifying a speaking subject, and class a recommendation engine with the speaking subject. The facility receives a response from the recommendation engine containing a speaking suggestion for the speaking subject. The facility then captures an audio/video sequence using the camera; concurrently with the capture, the facility causes the speaking suggestion to be displayed on the display device.

17 Claims, 6 Drawing Sheets

REAL-TIME AI-DRIVEN SPEAKING SUGGESTIONS DURING ASYNCHRONOUS VIDEO CAPTURE

CROSS-REFERENCE TO RELATED APPLICATIONS

This application claims the benefit of U.S. Patent Application No. 63/492,346, filed Mar. 27, 2023 and entitled "REAL-TIME AI-DRIVEN SPEAKING SUGGESTIONS DURING ASYNCHRONOUS VIDEO CAPTURE," which is hereby incorporated by reference in its entirety.

In cases where the present application conflicts with a document incorporated by reference, the present application controls.

BACKGROUND

Businesspeople commonly communicate using textual asynchronous digital communication modes such as email and text messages.

DETAILED DESCRIPTION

Figure 1:
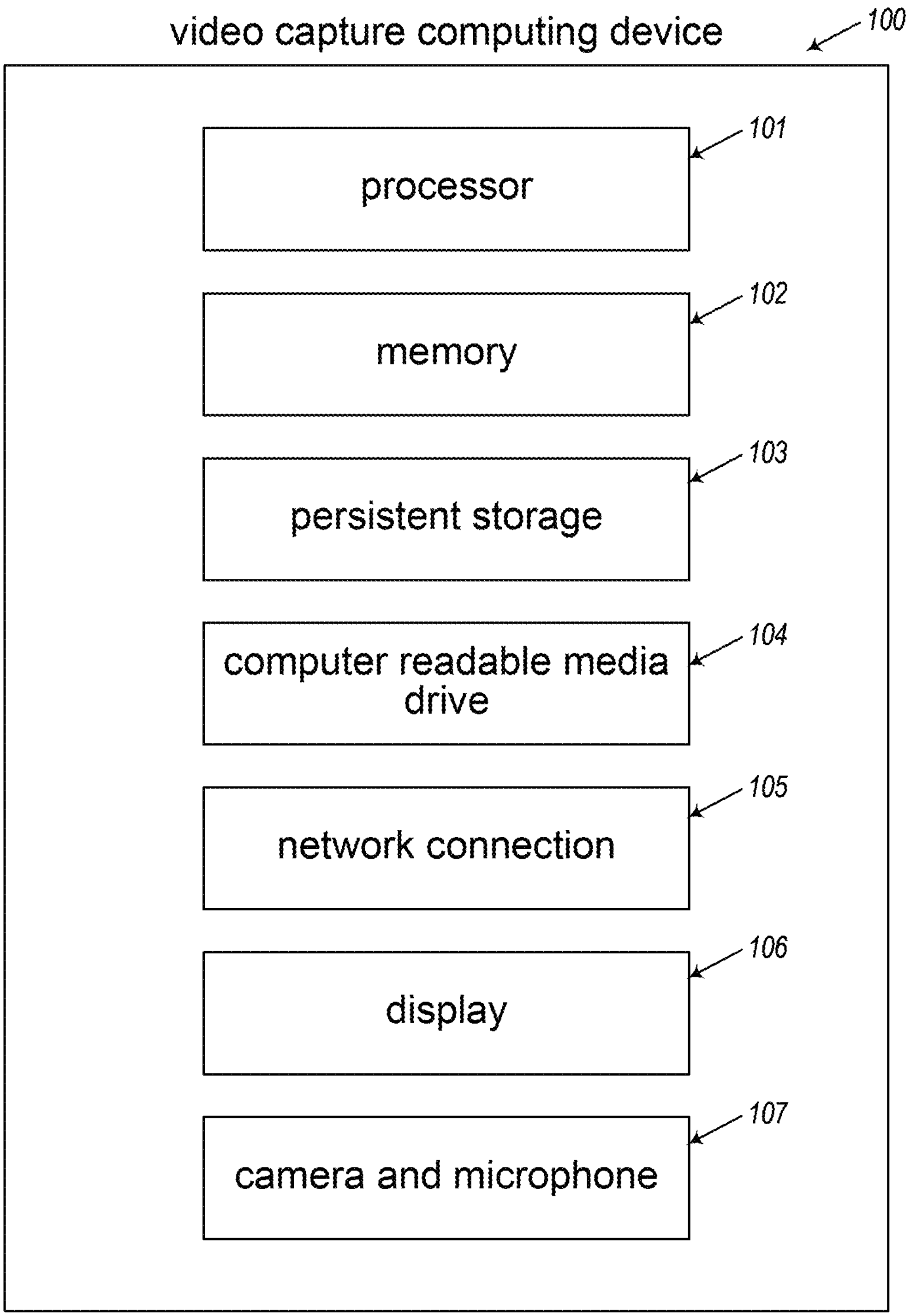
FIG. 1 is a block diagram showing some of the components typically incorporated in at least some of the mobile devices or computing devices on which the facility operates.

Human beings are wired to be social creatures and as such are blessed with an innate ability to glean significant information from the tone, body language, eye-contact, and demeanor of someone we are interacting with face to face. Unfortunately, with the advent of computing, the internet, and mobile devices, people have largely shifted significant portions of our communication into digital forms that strip away that social and visual information. In the work environment in particular, companies send billions of e-mails and digital text messages every single hour—all of which rely on a raw text form to communicate effectively.

Interestingly, the ability of people to capture and send asynchronous video as a superior, more emotive, more authentic communication channel has been available for decades but is rarely used today. A key gating factor to the broader use of asynchronous video stems from the inability for individuals to be able to construct, in real-time or near-real-time, a compelling message to record. Even the most seasoned business executive, when faced with a 'blank camera', often freezes—at a loss for words. Until now, this has not been a problem that technology could readily solve. However, with advent of new AI-based computing services and Large Language Models (LLMs) in particular, we have an opportunity close this gap and bring more authentic, emotive digital correspondence to the world.

The inventors have identified numerous disadvantages of current methods of attempting to record asynchronous digital video messages by individuals, independent of their comfort in speaking directly to a camera. First, the vast majority of individuals, because they are not formally trained, feel significant video-recording anxiety when faced with a 'blank camera' tuned to them and as a result they simply avoid putting themselves into situations where they would experience that emotional stress. Second, for those that do make the leap they often find themselves recording multiple attempts in order to try to capture what they consider to be an acceptable version with the right message; this creates a lot of rework, wasted time, and stress. Third, even who are relatively comfortable speaking in front of a crowd or camera when they have their prepared remarks are often at a loss for words when faced with the impromptu context of most video recording situations, which tend to be based upon ad-hoc and opportunistic events. Finally, to overcome some of these issues, individuals often create separate scripts or talking points which reside in a physical document they hold close to their person or a digital document which sits next to the recording software on their screen-both of which force them to shift their gaze away from the camera, creating a highly visible distraction and conveying a lack of speaking confidence and mastery. Also, it can be difficult and time-consuming to manually prepare one's own script.

In response to the inventors' recognition of these disadvantages, they have conceived and reduced to practice a software and/or hardware facility for embedding real-time speaking recommendations into an asynchronous video recording capture session in a way that reduces speaker anxiety, minimizes recording distractions, and avoids the creation of large, distracting segments of suggested text.

In some embodiments, the facility is implemented as a mobile application installed on a smartphone, a desktop computer application installed on a desktop or laptop device that supports video capture, a browser or application plug-in installed on a video capture computing device, or a web-site accessed by any of the aforementioned video capture computing devices.

In some embodiments, the recommendation services include text recommendation systems provided by third-party Large Language Model (LLM) providers via defined Application Programming Interfaces (APIs) or proprietary first-party systems owned and operated by the Applicant.

In some embodiments, the facility embeds a real-time speaking suggestion function into a connected video-recording client that can be easily instantiated if needed but isn't required for the recording to be completed. In some embodiments, the facility captures a speaking request suggestion from a user, via text or audio, combines that request with local contextual data from the connected device, account data about that user, and aggregated anonymous data from the system—and submits a modified request to a web-service that can process that request and provide a suggestion. In some embodiments, the facility takes the resulting response from the web-service, modifies it to fit the restrictions and constraints of the client interface, and presents the result back to the user in a way that can be easily read by the user while they are simultaneously speaking and recording, in a way that doesn't shift the user's gaze significantly away from the camera. In some embodiments, the facility allows for a one-click reset to the recommendations if those recommendations don't meet the expectations or the needs of the user. In some embodiments, the facility allows the user to pause the video recording mid-session, make a follow-on suggestion request which overrides the previous request, and then continue the video recording using the output of the latest prompt, resulting in single merged video stream.

By performing in some or all of the ways described above, the facility makes it easy to record a high-quality video message that is effective at communicating the intended message. Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by avoiding the multiple attempts that are frequently needed to arrive at an effective video message in the absence of the facility, it eliminates the use of additional processing resources that would have been consumed by the extra attempts.

Further, for at least some of the domains and scenarios discussed herein, the processes described herein as being performed automatically by a computing system cannot practically be performed in the human mind, for reasons that include that the starting data, intermediate state(s), and ending data are too voluminous and/or poorly organized for human access and processing, and/or are a form not perceivable and/or expressible by the human mind; the involved data manipulation operations and/or subprocesses are too complex, and/or too different from typical human mental operations; required response times are too short to be satisfied by human performance; etc. For example, the human mind is not capable of calling an application programming interface of an LLM or other machine learning model, nor superimposing script text over a live video view of a person recording a video.

FIG. 1 is a block diagram showing some of the components typically incorporated in at least some of the mobile devices or computer systems on which the facility operates. In various embodiments, these mobile devices and other devices or computer systems 100 can include desktop computer systems, mobile phones, tablet computers, personal digital assistants, laptop computer systems, netbooks, etc. In various embodiments, the mobile devices or other computer systems include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer readable media drive 104, such as a SD-card, floppy, CD ROM, or DVD drive, for reading programs and data stored on a computer-readable medium; a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like; a display 106 for displaying visual information or data to a user; and a video camera and audio capture device 107 for recording a visual and audio stream in real-time from a user. While computer systems configured as described above are typically used to support the operation of the facility, those skilled in the art will appreciate that the facility may be implemented using devices of various types and configurations, and having various components.

Figure 2:
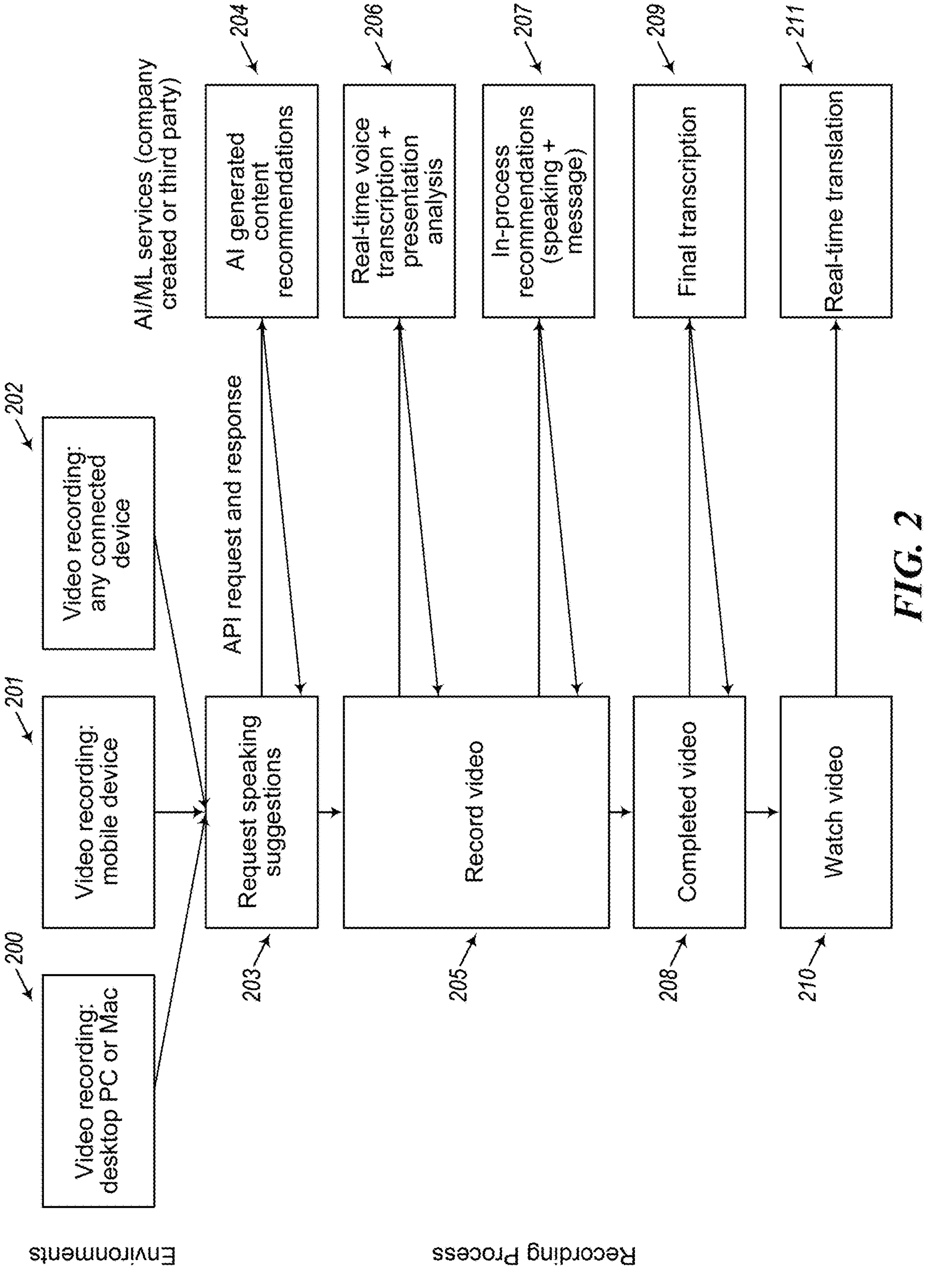
FIG. 2 is a flow diagram showing a process performed by the facility in some embodiments to embed real-time AI speaking suggestions into capture of an asynchronous video recording.

FIG. 2 is a flow diagram showing a process performed by the facility in some embodiments to embed real-time AI speaking suggestions into capture of an asynchronous video recording. A user first triggers a video recording session in one of multiple connected computing environments, such as a desktop computer 200, a mobile device 201, or a connected computing device 202 of another type. In act 203, the facility prompts the user with the option to receive real-time speaking suggestions. In some embodiments, the user types or verbalizes a speaking help request into a text input form. In act 204, the facility takes the request input, in some cases along with other unique context-setting data and constraints, and triggers a real-time call to a first- or third-party recommendation, algorithm, Large Language Model (LLM), or equivalent. In some embodiments, the facility makes this call to a Large Language Model such as GPT-3.5 or GPT-4 from Open AI, Inc. That request takes the form of an API call which includes the following parameters as of the date of this submission: 1) the specific model used; 2) the request to be processed; 3) temperature/randomizer parameters to define the response range; 4) length restrictions for the final output; and 5) other parameters that impact the response range. In some embodiments, the facility submits to the LLM the prompt "use casual language and put in bulleted summary form: <user-prompt>". In various embodiments, the facility uses a variety of other LLMs, such as Anthropic Claude, Facebook LLaMA, and/or Google Gemini. In some embodiments, the facility uses a third-party AI "intelligence as a service" recommendation tool other than an LLM. In some embodiments, the facility obtains a recommendation from a large language model or a model of another type trained based upon transcripts derived from videos earlier recorded by the facility for the same or similar subjects. These can be models trained from scratch on a corpus of video transcripts, or models subjected to retraining, supplemental training, tuning, or fine-tuning using this additional training material.

A speaking recommendation is served back from the recommendation engine and then displayed by the instantiating device or client. In some embodiments, the user instantiates a video recording process 205. The resulting video stream is interpreted—in some cases in real-time—by a set of first- or third-party services that extract a text transcript from the video and perform analysis 206 of the visual presentation in terms of speaking confidence, tone, presence, clarity, and more. In some embodiments, the system sends back speaking or stylistic recommendations on how the user can improve their presentation 207, either during the recording or afterward. Once the video recording is ended by the user 208, a final transcription is provided 209. In some embodiments, the user sends this video to one or more recipients who then watch the video 210. In some embodiments, the recipient user reads the previously transcribed final transcription in parallel to watching the video or requests a real-time language translation into an alternative language, which is provided by a first- or third-party translation engine 211.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 3:
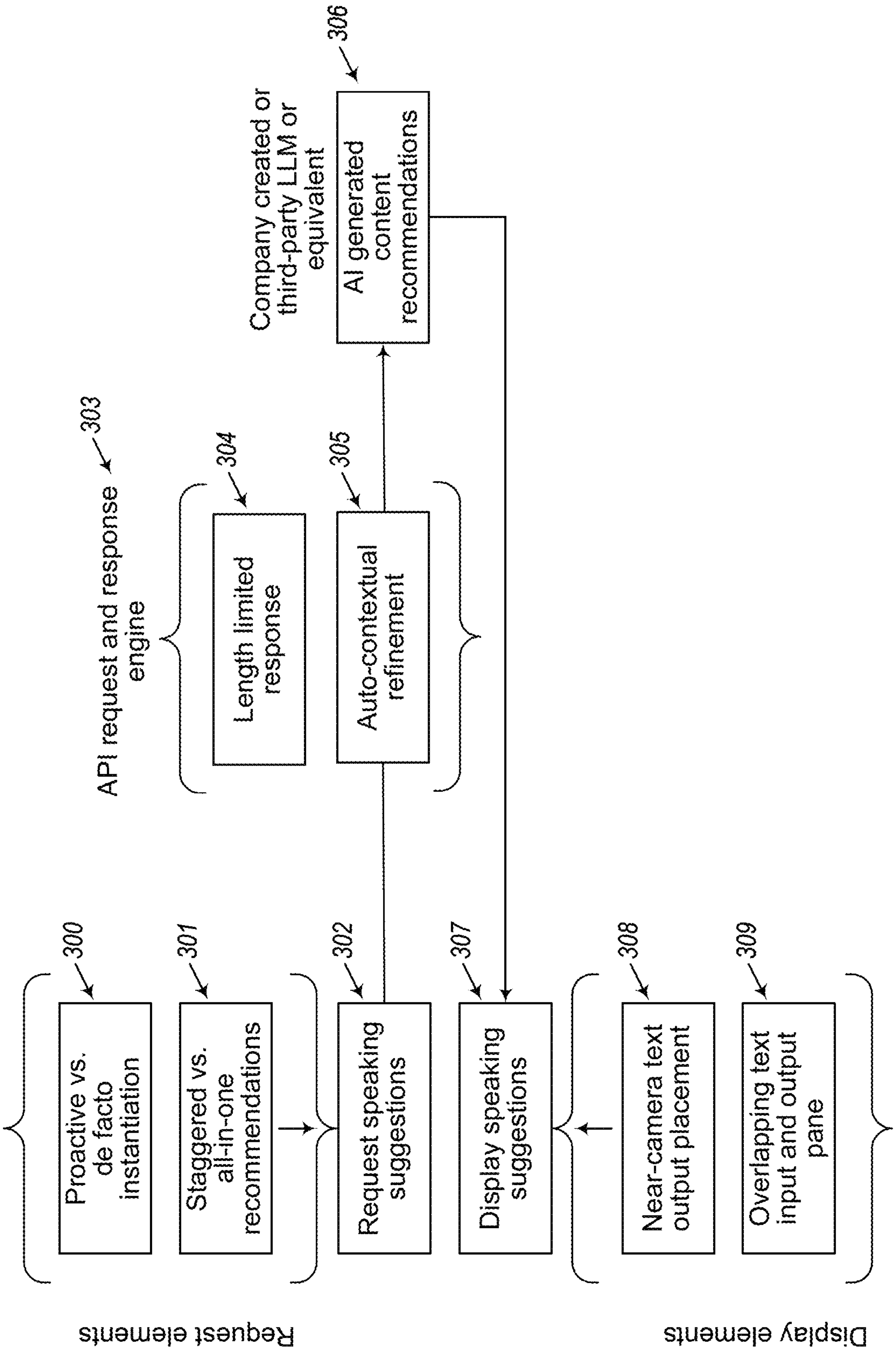
FIG. 3 is a block diagram showing elements included in the facility in some embodiments to provide real-time AI speaking suggestions in connection with asynchronous video capture.

FIG. 3 is a block diagram showing elements included in the facility in some embodiments to provide real-time AI speaking suggestions in connection with asynchronous video capture. In some embodiments, instantiation of a request for speaking assistance requires a proactive vs. automatic instantiation, via a button click or equivalent, of the functionality 300. This ensures that users are proactively seeking out the assistance vs. automatically defaulting to the assistance as a crutch. In some embodiments, the facility automatically initiates a request for speaking assistance, to minimize the effort needed to enjoy the benefit of this functionality. Once instantiated, the user enters the request for assistance via a text or voice entry interface 302. If the user needs more or longer guidance than can readily fit within the request interface element they pause the video recording, request a new suggestion, and continue recording with the new guidance overriding the previous suggestion 301. The system stitches the sections together using automatically created transitions. This avoids the problem of having a long, elongated, teleprompter like flow of content which can be difficult if not impossible to track. Once the request has been captured it moves into an API request and response engine 303 which takes that user request and modifies it to create an even more improved and relevant response output. It achieves this by forcefully narrowing the length and complexity of the recommendation 304 as well as tapping into the broad contextual data that the facility can uniquely provide in various embodiments. Such automatically integrated contextual data 305 can include but is not limited to data such as: the theme of the message, the title of the video message, the recipients that have been selected to receive the message, the emotional state of the user as gleaned through the camera or through audio capture, viewing rates of past or similar videos, and more. This enhanced request is then sent to a company-created or third-party content recommendation engine 306 which generates a recommended response based upon the defined parameters and refinements. The response is sent back to the instantiating client and displayed 307. In some embodiments, the resulting suggestion is specifically placed just below the camera capture point 308 to ensure eye-contact is maintained while the user is recording the video. Lastly, the response text replaces the original request text 309 without requiring a page refresh or taking the user to a different screen or set of screens-thereby keeping the users eyes as close to the camera as possible through the entire process.

Figure 4:
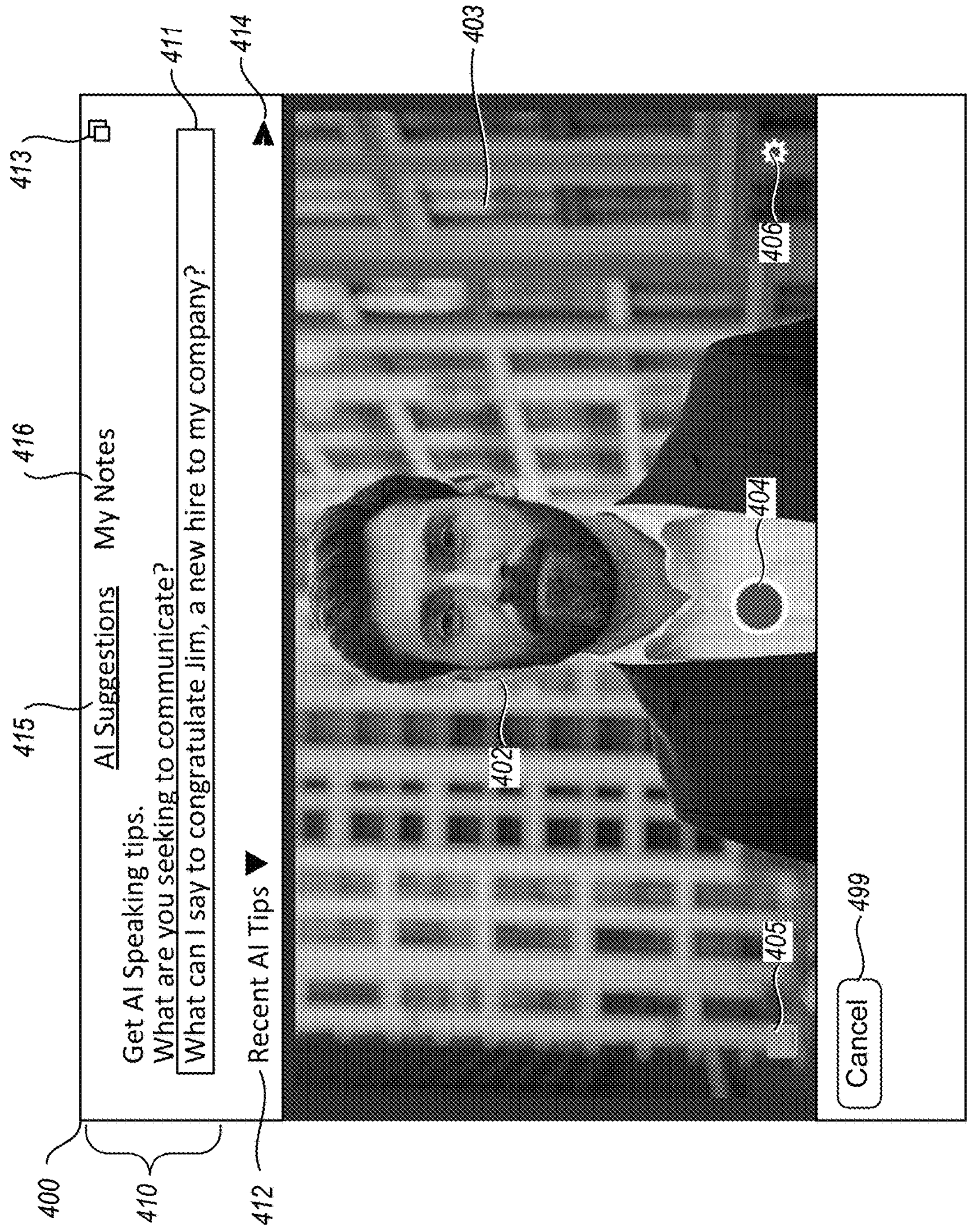
FIG. 4 is a screenshot diagram showing sample video recording screen 400, presented by the facility in some embodiments, in which the user submits a request for a speaking suggestion.
Figure 5:
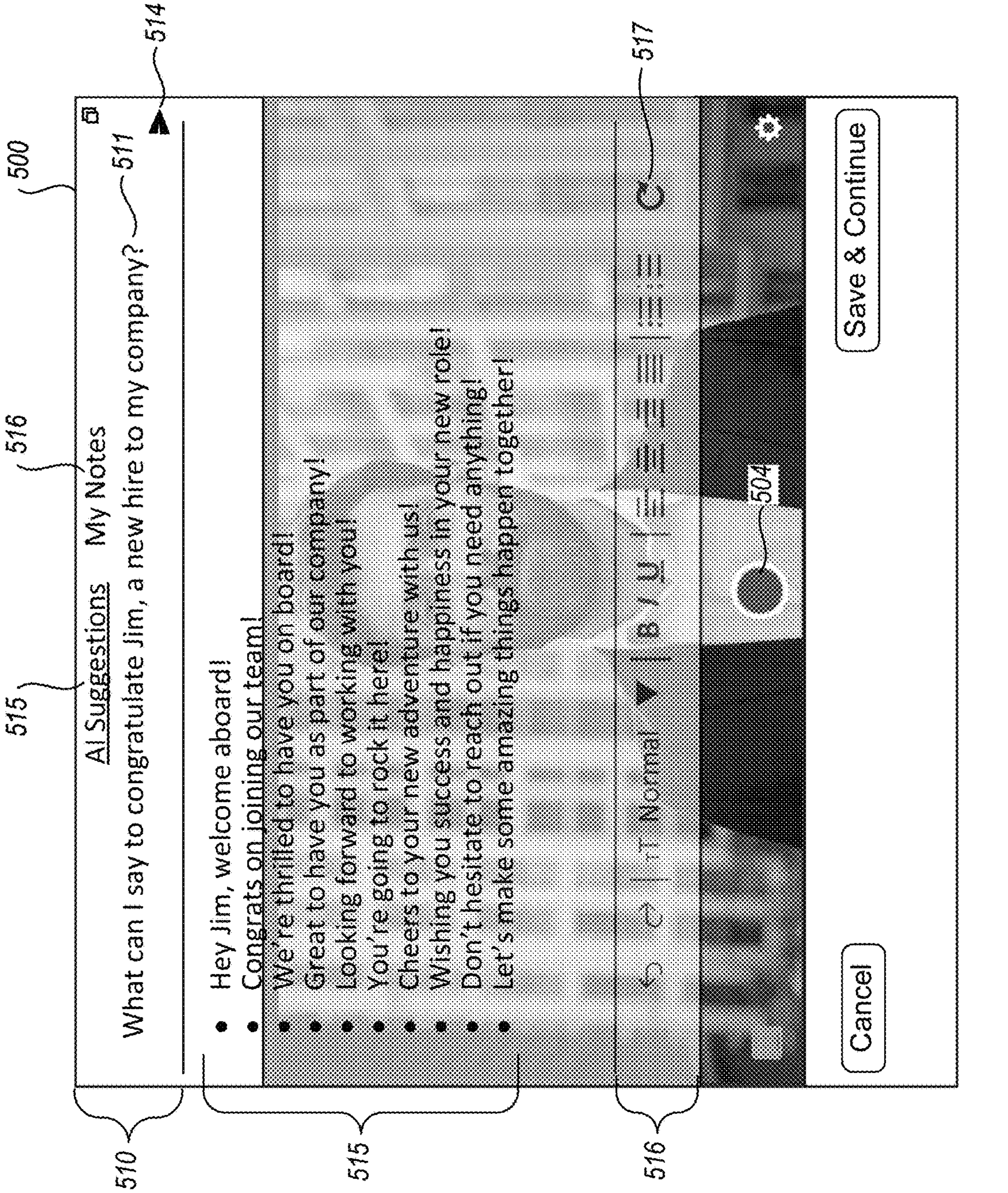
FIG. 5 is a screenshot diagram showing a sample video recording screen 500 presented by the facility in some embodiments, where the user views a video script ("speaking suggestion") automatically recommended by the facility during the process of recording a video.
Figure 6:
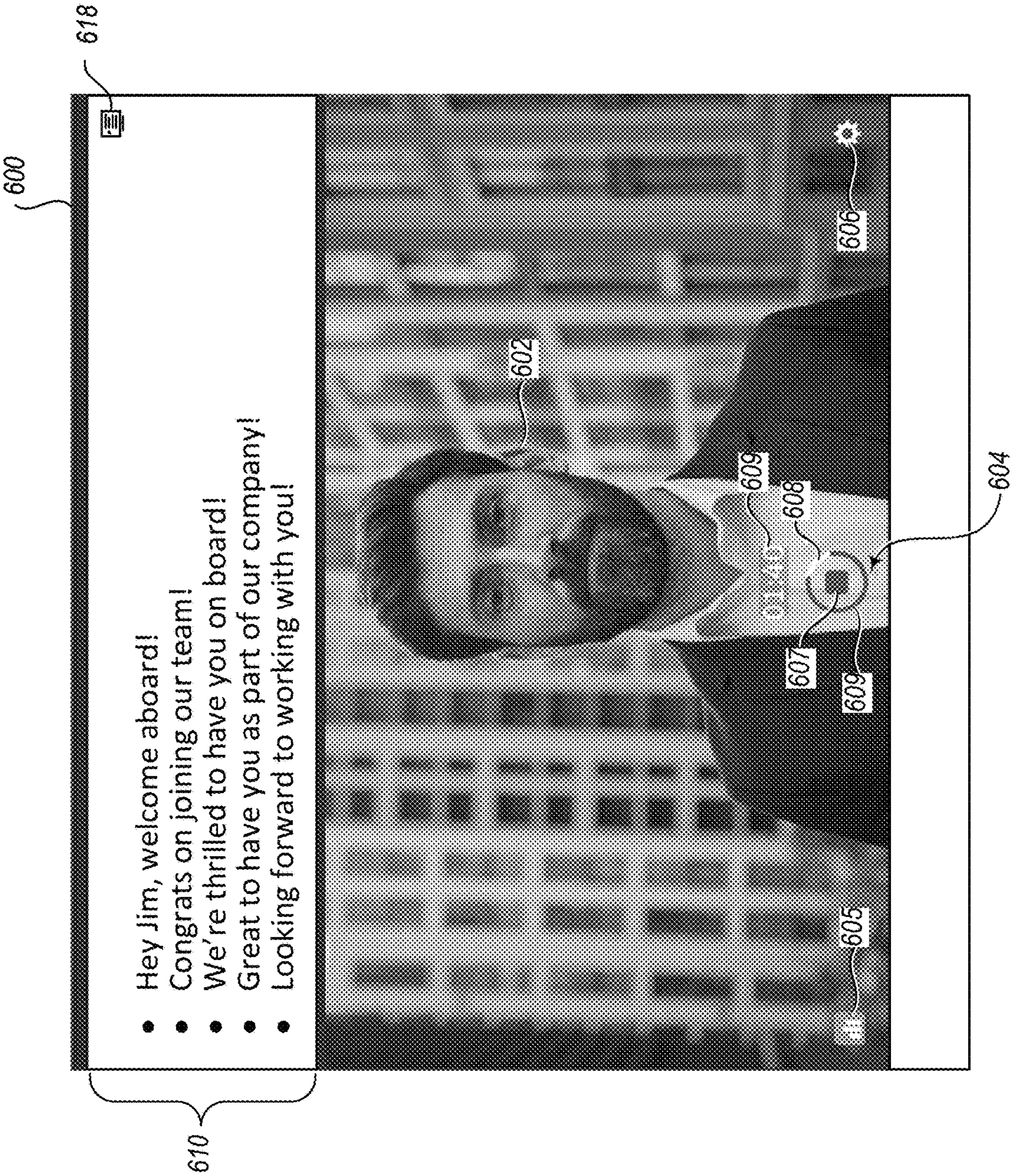
FIG. 6 is a screenshot diagram showing sample video recording screen 600, presented by the facility in some embodiments, that displays the output recommendation from the content recommendation engine.

FIGS. 4-6 discussed below show sample displays presented by the facility in some embodiments with respect to a sample video message recording session.

FIG. 4 is a screenshot diagram showing sample video recording screen 400, presented by the facility in some embodiments, in which the user submits a request for a speaking suggestion. The display 400 includes a real-time video view 401 of the user 402, and/or background 403, a recording button 404 that begins a video recording, and an area 410 to instantiate and ultimately view the speaking suggestions.

The user enters their request into the open text field 411, either by typing it or speaking it; in the latter case, the facility transcribes the speech audio into text on a real-time basis and populates it into the text field. The user can continue to edit or modify the request, and then presses the Enter or Submit button 414. The user can also activate control 412 in order to display and select among earlier-entered requests as basis for the speaking suggestions script.

While FIG. 4 and each of the display diagrams discussed below show a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

FIG. 5 is a screenshot diagram showing a sample video recording screen 500 presented by the facility in some embodiments, where the user views a video script ("speaking suggestion") automatically recommended by the facility during the process of recording a video. The display 500 includes AI suggestion window 510, which contains a script 515 automatically generated by the facility based upon the request 511. At this point, the user can edit the script; reformat it using formatting controls 516; and/or adjust the request and submit the adjusted request to receive an updated script. In some embodiments, the user can activate the Submit control 514 again without changing the request in order to seek a different recommendation from the facility for the original request. Once the user is satisfied with the script, the user can activate the recording control 504 in order to begin recording the video.

FIG. 6 is a screenshot diagram showing sample video recording screen 600, presented by the facility in some embodiments, that displays the output recommendation from the content recommendation engine. The recording screen includes a display panel 610 to present the recommendation during video recording, which in some embodiments completely overrides the request submission form 410 and 510. Here, because the computing device's camera is located above the center of its display, the facility positions the recommendation display panel at the top of the display near its center to keep the user's gaze on the camera. In some embodiments, the facility automatically determines the positioning of the camera and/or asks the user to provide this information, and facility positions the recommendation display panel accordingly. In some embodiments, the facility displays text near the camera position (such as at the top of the screen) in a different color—such as yellow—to attract the user's gaze toward the camera.

In some embodiments, the facility automatically scrolls the script contained in the display panel during video recording, based either on predicted reading pace or actual observed reading pace. In some embodiments, the facility manually scrolls the script, such as by using an input device such as a mouse or arrow keys. In some embodiments, the user can activate a script display expansion control 618 in order to display a version of the script that is larger, such as by dedicating a larger region of the display to the script's text, displaying the text in a larger size, and/or simultaneously accommodating more of the text. In some embodiments, the facility shifts the video window to another position on the display to provide additional space for the panel. While recording, the user sees a progress meter 604 made up of a white elapsed segment 608, as well as a green time remaining segment 609, which is accompanied by a textual indication 609 of the time remaining. The user can activate control 607 in order to end or pause the recording.

In some embodiments, if the user is giving a long presentation or speech, they can activate the pause button 607 to pause the video recording, resubmit a new request, and then continue with the recording. In this instance, the system combines those disparate video segments into a single video, automatically adding natural transitions between the segments.

It will be appreciated by those skilled in the art that the above-described facility may be straightforwardly adapted or extended in various ways. The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications, and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system having a display device and a camera positioned with respect to the display device, the method comprising:

receiving user input specifying a speaking subject;

calling a recommendation engine with the speaking subject;

receiving a response from the recommendation engine containing a speaking suggestion for the speaking subject;

capturing an audio/video sequence using the camera;

concurrently with capturing the audio/video sequence, causing the speaking suggestion to be displayed on the display device; and receiving additional user input specifying a recipient; and causing an indication of the captured audio/video sequence to be added to an inbox of the recipient.

2. The method of claim 1 wherein the speaking suggestion is displayed in a portion of the display device nearest the camera.

3. The method of claim 1, further comprising:

causing the displayed speaking suggestion to be scrolled during the capture of the audio/video sequence.

4. The method of claim 1, further comprising: receiving input from the recipient selecting the added indication; and in response to receiving the input from the recipient, causing the captured audio/video sequence to be rendered for the recipient.

5. The method of claim 1 wherein the recommendation engine is a large language model, and wherein the calling comprises:

concatenating the user input with predetermined text to obtain a prompt; and submitting the obtained prompt to the large language model.

6. The method of claim 5, further comprising:

for each of a plurality of captured audio/video sequences:

transcribing audio of the audio/video sequence to obtain transcribed text; and using he transcribed text to (1) train the large language model, (2) retrain the large language model, (3) perform supplemental training of the large language model, (4) tune the large language model, or (5) fine-tune the large language model.

7. The method of claim 1, further comprising:

receiving additional input adjusting the speaking suggestion; and revising the speaking suggestion in accordance with the received additional input, and wherein it is the revised speaking suggestion that is caused to be displayed.

8. One or more instances of non-transitory computer-readable media collectively having contents configured to cause a computing system to perform actions, wherein a display device and a camera positioned with respect to the display device are both being integrated into or connected to the computing system, the actions comprising:

receiving user input specifying a speaking subject;

calling a recommendation engine with the speaking subject;

receiving a response from the recommendation engine containing a speaking suggestion for the speaking subject;

capturing an audio/video sequence using the camera;

concurrently with capturing the audio/video sequence, causing the speaking suggestion to be displayed on the display device; and receiving additional user input specifying a recipient; and causing an indication of the captured audio/video sequence to be added to an inbox of the recipient.

9. The one or more instances of non-transitory computer-readable media of claim 8 wherein the speaking suggestion is displayed in a portion of the display device nearest the camera.

10. The one or more instances of non-transitory computer-readable media of claim 8, wherein the actions further comprise:

causing the displayed speaking suggestion to be scrolled during the capture of the audio/video sequence.

11. The one or more instances of non-transitory computer-readable media of claim 8 wherein the recommendation engine is a large language model, and wherein the calling comprises:

concatenating the user input with predetermined text to obtain a prompt; and submitting the obtained prompt to the large language model.

12. The one or more instances of non-transitory computer-readable media of claim 11, wherein the actions further comprise:

for each of a plurality of captured audio/video sequences:

transcribing audio of the audio/video sequence to obtain transcribed text; and using he transcribed text to (1) train the large language model, (2) retrain the large language model, (3) perform supplemental training of the large language model, (4) tune the large language model, or (5) fine-tune the large language model.

13. A computing system, comprising:

a camera;

a microphone;

at least one processor; and a memory, the memory have contents configured to cause the at least one processor to perform a method, the method comprising:

receiving user input specifying a speaking subject;

calling a recommendation engine with the speaking subject;

receiving a response from the recommendation engine containing a speaking suggestion for the speaking subject;

capturing an audio/video sequence using the camera and microphone; and concurrently with capturing the audio/video sequence, causing the speaking suggestion to be displayed on the display device;

receiving additional user input specifying a recipient; and causing an indication of the captured audio/video sequence to be added to an inbox of the recipient.

14. The computing system of claim 13 wherein the speaking suggestion is displayed in a portion of the display device nearest the camera.

15. The computing system of claim 13, the method further comprising: receiving input from the recipient selecting the added indication; and in response to receiving the input from the recipient, causing the captured audio/video sequence to be rendered for the recipient.

16. The computing system of claim 13 wherein the recommendation engine is a large language model, and wherein the calling comprises:

concatenating the user input with predetermined text to obtain a prompt; and submitting the obtained prompt to the large language model.

17. The computing system of claim 16, the method further comprising:

for each of a plurality of captured audio/video sequences:

transcribing audio of the audio/video sequence to obtain transcribed text; and using he transcribed text to (1) train the large language model, (2) retrain the large language model, (3) perform supplemental training of the large language model, (4) tune the large language model, or (5) fine-tune the large language model.

* * * * *